(12) United States Patent
Suzuki

(10) Patent No.: US 10,903,579 B2
(45) Date of Patent: Jan. 26, 2021

(54) SHEET-TYPE METAMATERIAL AND SHEET-TYPE LENS

(71) Applicant: National University Corporation Tokyo University of Agriculture and Technology, Tokyo (JP)

(72) Inventor: Takehito Suzuki, Hitachi (JP)

(73) Assignee: National University Corporation Tokyo University of Agriculture and Technology, Tokyo (JP)

( * ) Notice: Subject to any disclaimer, the term of this patent is extended or adjusted under 35 U.S.C. 154(b) by 324 days.

(21) Appl. No.: 16/080,611

(22) PCT Filed: Feb. 7, 2017

(86) PCT No.: PCT/JP2017/004381
§ 371 (c)(1),
(2) Date: Aug. 28, 2018

(87) PCT Pub. No.: WO2017/150098
PCT Pub. Date: Sep. 8, 2017

(65) Prior Publication Data
US 2019/0074595 A1    Mar. 7, 2019

(30) Foreign Application Priority Data
Feb. 29, 2016 (JP) ................. 2016-038296

(51) Int. Cl.
*H01Q 15/00* (2006.01)
*H01Q 15/10* (2006.01)
(Continued)

(52) U.S. Cl.
CPC ......... *H01Q 15/0086* (2013.01); *G02B 1/007* (2013.01); *H01Q 15/10* (2013.01); *H01Q 15/04* (2013.01)

(58) Field of Classification Search
CPC .... G02B 1/007; H01Q 15/10; H01Q 15/0086; H01Q 15/04
(Continued)

(56) References Cited

U.S. PATENT DOCUMENTS 8,198,953 B2 * 6/2012 Sanada .............. H01Q 15/0086
333/23
10,686,255 B2 * 6/2020 Suzuki ................. H05K 1/0213
(Continued)

FOREIGN PATENT DOCUMENTS

JP      2008-507733 A     3/2008

OTHER PUBLICATIONS

Apr. 25, 2017 International Search Report issued in International Patent Application No. PCT/JP2017/004381.
(Continued)

*Primary Examiner* — Evelyn A Lester

(57) ABSTRACT

A sheet-type metamaterial includes: a film-shaped dielectric substrate; a first and second wire array formed on the dielectric substrate's front surface and back surface respectively. The first wire array includes elongated metallic first cut wires of a length aligned in a y-axis direction with a gap g therebetween and in an x-axis direction with space s therebetween. The second wire array includes second cut wires having the same shape as first cut wires and aligned so as to overlap first cut wires and to be symmetric with the first cut wires. With a design frequency set at 0.51 THz, the dielectric substrate's thickness d is set at about 50 μm, space s is set at about 361 μm, gap g is set at about 106 μm, and the length of first and second cut wires is set at a length approximate to a value to generate resonance at a working frequency.

3 Claims, 11 Drawing Sheets

(51) Int. Cl.
　　　*G02B 1/00*　　　(2006.01)
　　　*H01Q 15/04*　　(2006.01)
(58) Field of Classification Search
　　　USPC .......................................................... 359/652
　　　See application file for complete search history.

(56) References Cited

U.S. PATENT DOCUMENTS

| 2008/0165079 | A1  | 7/2008  | Smith et al. | |
|---|---|---|---|---|
| 2009/0033586 | A1* | 2/2009  | Sanada | H01P 3/00 343/911 R |
| 2012/0299670 | A1* | 11/2012 | Liu | G02B 1/002 333/239 |

OTHER PUBLICATIONS

Apr. 25, 2017 Written Opinion issued in International Patent Application No. PCT/JP2017/004381.

Oyama et al.; "TM Wave Rejection Characteristics of Sheet-Type Artificial Materials Composed of Pairs of Metal Patterns"; Proceedings of the 2011 IEICE General Conference Electronics 1, Feb. 28, 2011, p. 114.

Mana et al.; "Theoretical explanation about special characteristics of optical metamaterial having zero refractive index"; National Institute for Materials Science, searched online, Feb. 14, 2016; http://www.nims.got/news/press/2015/12/201512160.html.

* cited by examiner

| *l* | 202.2 μm |
| --- | --- |
| *g* | 106 μm |
| *w* | 120.2 μm |
| *s* | 360.7 μm |
| *d* | 50 μm |
| *t* | 0.5 μm |

Design frequency 0.51THz
Cyclo-olefin polymer
$\varepsilon r = 2.34$, $\tan \delta = 0.0016$

| $r$ | 2.41 mm |
| --- | --- |
| $p$ | 20 μm |
| $n_1$ | 5.00 |
| $n_{81}$ | 0 |
| $n_{121}$ | -5.92 |

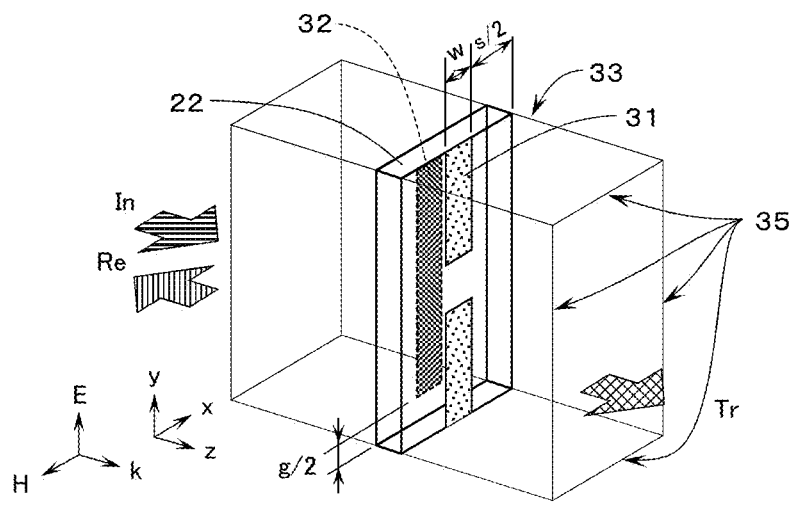
Fig.15
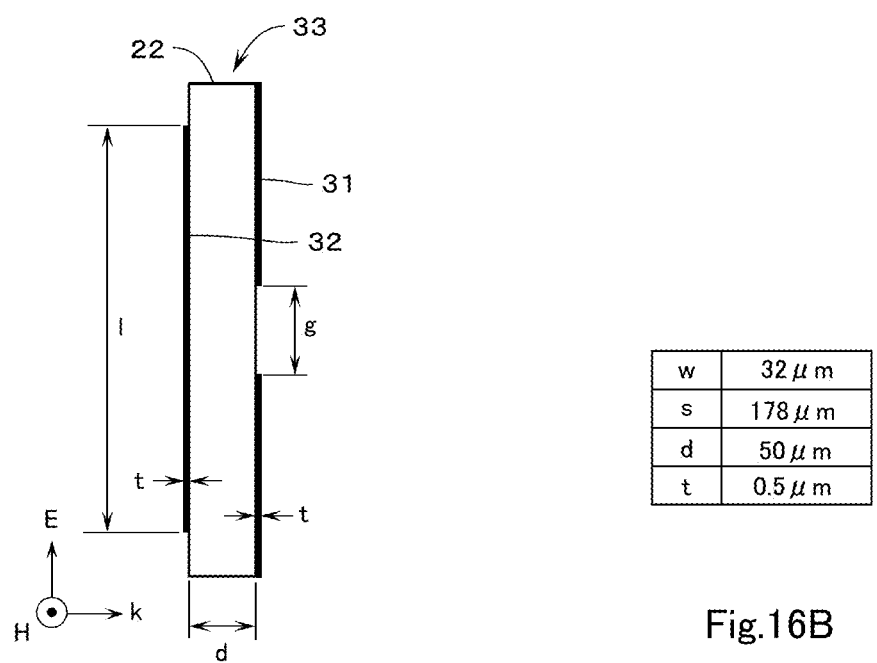
Fig.16A
| w | 32 μm |
| --- | --- |
| s | 178 μm |
| d | 50 μm |
| t | 0.5 μm |
Fig.16B

SHEET-TYPE METAMATERIAL AND SHEET-TYPE LENS

TECHNICAL FIELD

The present invention relates to a sheet-type metamaterial functioning as a metamaterial with cut wires arranged on opposite surfaces of a dielectric substrate, and a sheet-type lens using the sheet-type metamaterial.

BACKGROUND ART

Veselago showed that incidence of light on a medium having a permittivity and a permeability both of negative values causes negative refraction, and an artificial structure producing a negative permeability and a negative permittivity has been suggested. Such an artificial structure producing a negative permeability and a negative permittivity is an aggregate of structures having a scale sufficiently larger than atomic and smaller than a light wavelength and is called a metamaterial. Using the metamaterial as a negative refractive medium allows formation of a perfect lens having a planar shape. The perfect lens overcomes diffraction limitation to allow observation of a fine object and allows accurate near-field reproduction (evanescent wave).

A metamaterial is applicable to a lens for a terahertz wave having received attention in recent years. A terahertz wave is an electromagnetic wave having a frequency from 0.1 to 10 THz (wavelength from 30 to 3000 μm). This wavelength region is substantially the same as a range from the wavelength region of a far-infrared wave to that of a millimeter wave region. The terahertz wave exists in a frequency range between the frequency of "light" and that of a "millimeter wave." Thus, the terahertz wave has both an ability to identify an object with a spatial resolution as high as that of light and an ability comparable to that of a millimeter wave to pass through a substance. A terahertz wave band has been an electromagnetic wave not having been explored so far. Meanwhile, applications for example characterization of a material that is to be achieved by time-domain spectroscopy, imaging, and tomography, have been examined utilizing the characteristics of the electromagnetic wave in this frequency band. The terahertz wave has both the ability of passing through a substance and straightness. Thus, generating the terahertz wave instead of an X-ray allows safe and innovative imaging or ultrahigh-speed radio communication of some hundreds of Gbps.

In particular, terahertz imaging is one of quite attractive visualization techniques to take the place of an X ray for realizing safety, security, and high precision. Terahertz nano-imaging has been reported to achieve terahertz near-field nano-imaging overcoming diffraction limitation or reported to obtain a resolution of 400 nm (one wavelength divided by 540) at 1.4 THz. Terahertz imaging has also been reported to achieve imaging at 0.3 THz using a resonant tunneling diode. Using a metamaterial allows design of a negative refractive index and is expected to achieve a flat perfect lens overcoming diffraction limitation by restoring near field light to become an evanescent component at a separate location.

The applicant of this application filed Japanese Patent Application No. 2015-16116 suggesting a sheet-type metamaterial achieving a negative refractive index in a terahertz wave band with low loss. The application of this application further filed Japanese Patent Application No. 2015-154943 suggesting a sheet-type metamaterial achieving a high refractive index in a terahertz wave band with low loss.

A metamaterial capable of achieving a zero refractive index has also been suggested (see non-patent literature 1). FIG. 21 is a conceptual view showing a conventional metamaterial 100 achieving a zero refractive index. The metamaterial 100 shown in FIG. 21 has a periodic structure formed by stacking metals 110 and dielectric substances 111 periodically. In this metamaterial, an effective refractive index becomes zero at a particular frequency (critical state). A phase does not progress in a substance having a zero refractive index. Specifically, as illustrated, light does not behave like a moving wave with a series of peaks and valleys traveling in space. Instead, the substance having a zero refractive index has a stationary phase with all peaks or with all valleys to produce an almost infinitely long wavelength. Such peaks or valleys do not oscillate in space but they oscillate only as time variables. Such a uniform phase causes light to expand, shrink, twist, or bend without energy loss. Thus, if light enters the metamaterial 100 from above as illustrated, the light propagates in the metamaterial 100 with a constant phase without causing phase change (infinite phase velocity).

CITATION LIST

Non-Patent Literature

Non-patent literature 1: "Theoretical explanation about special characteristics of optical metamaterial having zero refractive index," National Institute for Materials Science, searched online, Feb. 14, 2016, at http://www.nims.go.jp/news/press/2015/12/201512160.html

SUMMARY OF INVENTION

Technical Problem

A terahertz wave propagating in a material having a negative refractive index has a phase progressing in a direction opposite a traveling direction. As described above, a terahertz wave propagating in a material having a zero refractive index has a constant phase, and a terahertz wave propagating in a material having a positive refractive index has a phase progressing in a traveling direction. This shows that combining a material having a negative refractive index, a material having a zero refractive index, and a material having a positive refractive index achieves extended phase control in a terahertz wave not feasible with materials in nature. Combining a material having a negative refractive index, a material having a zero refractive index, and a material having a positive refractive index also achieves a metamaterial lens having distributed refractive indexes.

However, the foregoing conventional metamaterial having a zero refractive index has a periodic structure formed by stacking the metals 110 and the dielectric substances 111 periodically. This makes it likely that a terahertz wave will attenuate in the periodic structure, causing a problem of failing to achieve favorable transmission power characteristics easily. Further, the foregoing conventional metamaterial having a zero refractive index also has a problem of failing to provide a lens in a terahertz wave band having distributed refractive indexes because a negative refractive index and a positive refractive index are not set.

It is therefore an object of the present invention to provide a sheet-type metamaterial having a configuration with a dielectric substrate and metallic cut wires arranged on opposite surfaces of the dielectric substrate and achieving a zero refractive index in a terahertz wave band, and a sheet-type lens having a configuration with a dielectric substrate and metallic cut wires arranged on opposite surfaces of the dielectric substrate and achieving distributed refractive indexes in a terahertz wave band.

Solution to Problem

To achieve the above-described object, a sheet-type metamaterial of the present invention is most principally characterized in that the sheet-type metamaterial comprises: a film-shaped dielectric substrate; a first wire array formed on one surface of the dielectric substrate; and a second wire array formed on an opposite surface of the dielectric substrate, the first wire array includes elongated metallic first cut wires of a predetermined length l aligned in a direction of a y axis of the dielectric substrate with a gap g therebetween and in an x-axis direction perpendicular to the y axis with space s therebetween, the second wire array includes metallic second cut wires having the same shape as the first cut wires and aligned so as to overlap the first cut wires and to be symmetric with the first cut wires, and with a design frequency set at 0.51 THz, a thickness d of the dielectric substrate is set at 50 μm, the space s is set at 360.7 μm, the gap g is set at 105 μm or 106 μm, the width w of the first cut wires and the second cut wires is set at 120.2 and the length l of the first cut wires and the second cut wires is set at 202.2 μm or 205 μm.

A sheet-type lens of the present invention is a sheet-type lens comprising a large number of unit cells aligned on a film-shaped dielectric substrate. The sheet-type lens is most principally characterized in that the unit cells each include an elongated metallic first cut wire of a predetermined length l formed on one surface of the dielectric substrate, and a metallic second cut wire having the same shape as the first cut wire and formed on an opposite surface of the dielectric substrate, the first cut wires of the unit cells are aligned on the one surface of the dielectric substrate in a y-axis direction with a gap g therebetween and in an x-axis direction perpendicular to the y-axis direction with space s therebetween, the second cut wires of the unit cells are aligned on the opposite surface of the dielectric substrate in the y-axis direction with the gap g therebetween and in the x-axis direction perpendicular to the y-axis direction with the space s therebetween, the first cut wire and the second cut wire each have a long axis extending substantially parallel to the y-axis direction, the dielectric substrate has a region divided into n regions from a region at a central part to a region at an outer edge of the dielectric substrate, an innermost first region R1 has a positive refractive index, an outermost n-th region Rn has a negative refractive index, a predetermined region Rk between the first region R1 and the n-th region Rn has a zero refractive index, and a refractive index is reduced gradually with an increasing distance from the first region R1 toward the n-th region Rn.

In the sheet-type lens of the present invention, in regions between the first region R1 and the region Rk, the first cut wire and the second cut wire are arranged to overlap each other and to be symmetric with each other, and in regions between a region R(k+1) next to the region Rk and the n-th region Rn, the first cut wire and the second cut wire are arranged to overlap each other and to be asymmetric with each other by being shifted in the y-axis direction. In the sheet-type lens of the present invention, further, to obtain a predetermined refractive index, dimensions about the first cut wire and the second cut wire including a width w, the predetermined length l, the space s, and the gap g are adjusted in regions from the first region to the n-th region.

Advantageous Effect of Invention

In the configuration of the present invention, the metallic cut wires are arranged on the opposite surfaces of the dielectric substrate. With a design frequency set at 0.51 THz, the thickness d of the dielectric substrate is set at about 50 μm, the space s is set at about 361 μm, the gap g is set at about 106 μm, and the length l of the first cut wires and the second cut wires is set at a length approximate to a value to generate resonance at a working frequency. By doing so, a sheet-type metamaterial having a refractive index of nearly zero in a terahertz wave band can be achieved. Further, the unit cells are formed on the film-shaped dielectric substrate in such a manner that a refractive index changes from positive to zero and zero to negative with an increasing distance from the innermost first region toward the outermost n-th region. This makes it possible to provide a sheet-type lens in a terahertz wave band having a shape like a single film and having distributed refractive indexes.

BRIEF DESCRIPTION OF DRAWINGS

FIG. 15 is a perspective view showing the configuration of a unit cell having a negative refractive index with a periodic boundary wall in the sheet-type lens according to the embodiment of the present invention.

FIG. 16A is a side view showing the configuration of the unit cell having a negative refractive index in the sheet-type lens according to the embodiment of the present invention, and FIG. 16B is a table showing exemplary dimensions of the unit cell.

DESCRIPTION OF EMBODIMENTS

Figure 1:
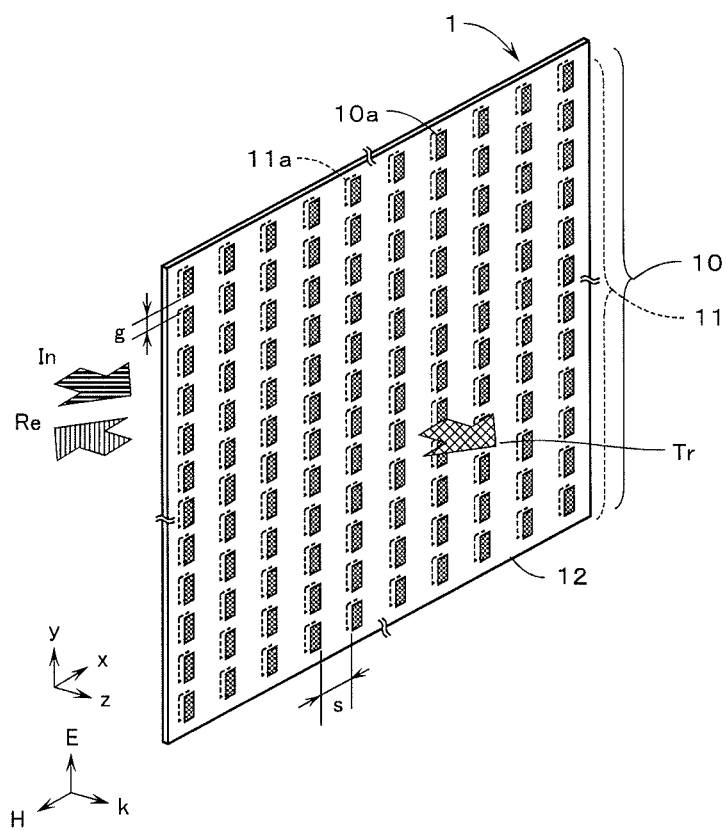
FIG. 1 is a perspective view showing the configuration of a sheet-type metamaterial according to an embodiment of the present invention.
Figures 2, 3:
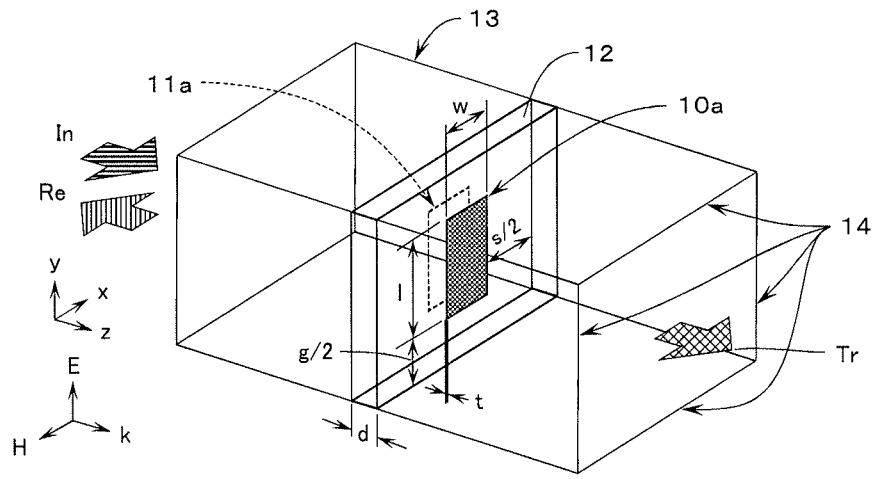
FIG. 2 is a perspective view showing the configuration of a unit cell with a periodic boundary wall in the sheet-type metamaterial according to the embodiment of the present invention.
FIG. 3 is a table showing exemplary dimensions of the unit cell in the sheet-type metamaterial according to the embodiment of the present invention.

FIG. 1 is a perspective view showing the configuration of a sheet-type metamaterial 1 according to an embodiment of the present invention. FIG. 2 is a perspective view showing the configuration of a unit cell 13 with a periodic boundary wall corresponding to the configuration of one period of the sheet-type metamaterial 1 according to the embodiment of the present invention.

The sheet-type metamaterial 1 according to the embodiment of the present invention shown in these drawings operates as a sheet-type metamaterial having a nearly zero refractive index in a terahertz wave band. As shown in FIGS. 1 and 2, the sheet-type metamaterial 1 is formed on a surface of a rectangular dielectric substrate 12 made of a flexible film placed in an x-y plane with a large number of first cut wires 10a each having an elongated rectangular shape aligned at predetermined intervals in a y-axis direction and an x-axis direction, and on a back surface of a rectangular dielectric substrate 12 with a large number of second cut wires 11a each having the same elongated rectangular shape as the first cut wires 10a aligned so as to overlap the first cut wires 10a and to be symmetric with the first cut wires 10a. In this case, the first cut wires 10a and the second cut wires 11a extend lengthwise in a direction parallel to the y axis and are arranged in a matrix to be parallel to each other.

A large number of rectangular first cut wires 10a each extending in an elongated shape in the y-axis direction and having a length l are formed to be arranged on the front surface of the dielectric substrate 12 in such a manner that the first cut wires 10a are aligned in the y-axis direction with a gap g therebetween and with the respective center axes agreeing with each other, and are aligned to be parallel to each other in the x-axis direction with space s therebetween. Multiple first cut wires 10a are formed on the front surface of the dielectric substrate 12 in a matrix with the gap g and the space s to form a first wire array 10. A large number of elongated rectangular second cut wires 11a having the length l are formed on the back surface of the dielectric substrate 12 so as to overlap the first cut wires 10a and to be symmetric with the first cut wires 10a in such a manner that the second cut wires 11a are aligned in the y-axis direction with the gap g therebetween and having a common central axis, and are aligned to be parallel to each other in the x-axis direction with the space s therebetween. Multiple second cut wires 11a are formed on the back surface of the dielectric substrate 12 in a matrix with the gap g and the space s to form a second wire array 11. As described above, the long axis of each of the first cut wire 10a and the second cut wire 11a extends substantially parallel to the y-axis direction. For example, the dielectric substrate 12 is made of a cycloolefin polymer film having a relative permittivity of about 2.34 and low-loss characteristics expressed by tan δ of about 0.0016. The dielectric substrate 12 may be a different low-loss dielectric film.

The sheet-type metamaterial 1 according to the present invention having the above-described configuration is equivalent to a configuration with a large number of unit cells 13 shown in FIG. 2 arranged at predetermined intervals in a matrix. As shown in FIG. 2, the first cut wire 10a and the second cut wire 11a each have a width w and the length l. In the unit cell 13, the rectangular dielectric substrate 12 has a breadth determined by adding the space s to the width w, a vertical length determined by adding the gap g to the length l, and a thickness d. The first cut wire 10a and the second cut wire 11a are each formed, for example, by etching a metallic film formed on the dielectric substrate to a thickness t.

The unit cell 13 is arranged in the x-y plane and surrounded by a periodic boundary wall 14, as shown in FIG. 2. An incident wave In in a terahertz wave band polarized in the y-axis direction enters through the periodic boundary wall 14. A reflected component of the incident wave In becomes a reflected wave Re and a transmitted component of the incident wave In becomes a transmitted wave Tr. The incident wave In has an electric field component E acting in the y-axis direction and a magnetic field component H acting in the x-axis direction. The incident wave In travels in a direction k corresponding to a z-axis direction. Then, flux linkage is generated to cause a flow of a current in an opposite direction between the first cut wire 10a and the second cut wire 11a on the dielectric substrate 12 to make the first cut wire 10a and the second cut wire 11a function as a magnetic particle. In particular, at frequencies around a resonant frequency determined based on the length l of the first cut wire 10a and the second cut wire 11a, a frequency band where an equivalent permeability is nearly zero is generated. Further, polarization is generated on the first cut wire 10a and the second cut wire 11a by the application of the electric field E acting in the y-axis direction to make the first cut wire 10a and the second cut wire 11a further function as a dielectric particle. In particular, at frequencies around a resonant frequency determined based on the length l of the first cut wire 10a and the second cut wire 11a, a frequency band where an equivalent permittivity is nearly zero is generated.

In a configuration like that of the unit cell 13 shown in FIG. 2 where the first cut wires 10a and the second cut wires 11a on the front surface and the back surface of the dielectric substrate 12 overlap each other, a resonant frequency indicating dielectric properties is known to be higher than a resonant frequency indicating magnetic properties. By contrast, in the sheet-type metamaterial 1 according to the present invention, the resonant frequency indicating magnetic properties can be increased to become substantially the same as the resonant frequency indicating dielectric properties, as described later. One of possible reasons for this can be considered that the resonant frequency indicating dielectric properties is reduced by increase in a capacitance between the first cut wires 10a and the second cut wires 11a facing each other via the dielectric substrate 12. Metal having favorable conductivity such as gold, silver, copper, or aluminum is used as a metallic material for forming the first cut wires 10a and the second cut wires 11a.

FIG. 3 shows exemplary dimensions of the unit cell 13 with a design frequency set at 0.51 THz. According to the exemplary dimensions of the unit cell 13 shown in FIG. 3, the length l of the first cut wire 10a and the second cut wire 11a is set at about 202.2 μm, the gap g between the first cut wires 10a and between the second cut wires 11a in the y-axis direction at about 106 μm, the width w of the first cut wire 10a and the second cut wire 11a at about 120.2 μm, the space s between the first cut wires 10a and between the second cut wires 11a in the x-axis direction at about 360.7 μm, the thickness d of the dielectric substrate 12 at about 50 μm, and the thickness t of the first cut wire 10a and the second cut wire 11a at about 0.5 μm. In the sheet-type metamaterial 1 according to the present invention, dimensions including the thickness d of the dielectric substrate 12 are set within their operating ranges. In this case, the dielectric substrate 12 made of a flexible cycloolefin polymer film has a relative permittivity of about 2.34 and tan δ of about 0.0016. A wavelength shortening ratio at the dielectric substrate 12 is about 0.654. This shows that, while one wavelength (λ) of a frequency with the design frequency of 0.51 THz is about 588.2 μm, this wavelength is shortened to about 384 μm on the dielectric substrate 12, and that the length l of the first cut wire 10a and the second cut wire 11a is set at a length to generate resonance, which is about λ/2.

FIGS. 4 to 8 show analysis results and experimental results about the electrical characteristics of the unit cell 13 having the dimensions shown in FIG. 3 in the sheet-type metamaterial 1 according to the present invention. In FIGS. 4 to 8, the experimental results are indicated by black dots and the analysis results are indicated by solid lines. The analysis was conducted using a high-frequency three-dimensional electromagnetic field simulator HFSS. The analysis was conducted on condition that the first cut wire 10a and the second cut wire 11a are made of perfect conductors. As a result of the analysis on the unit cell 13 having the dimensions shown in FIG. 3, an effective refractive index $n_{eff}$ obtained at 0.51 THz is a nearly zero refractive index of about 0.076+j0.022. Further, transmission power obtained at this frequency has favorable transmission power characteristics of about 97.7%. The reflected wave Re has a tiny reflection power of about 0.058%.

Figure 4:
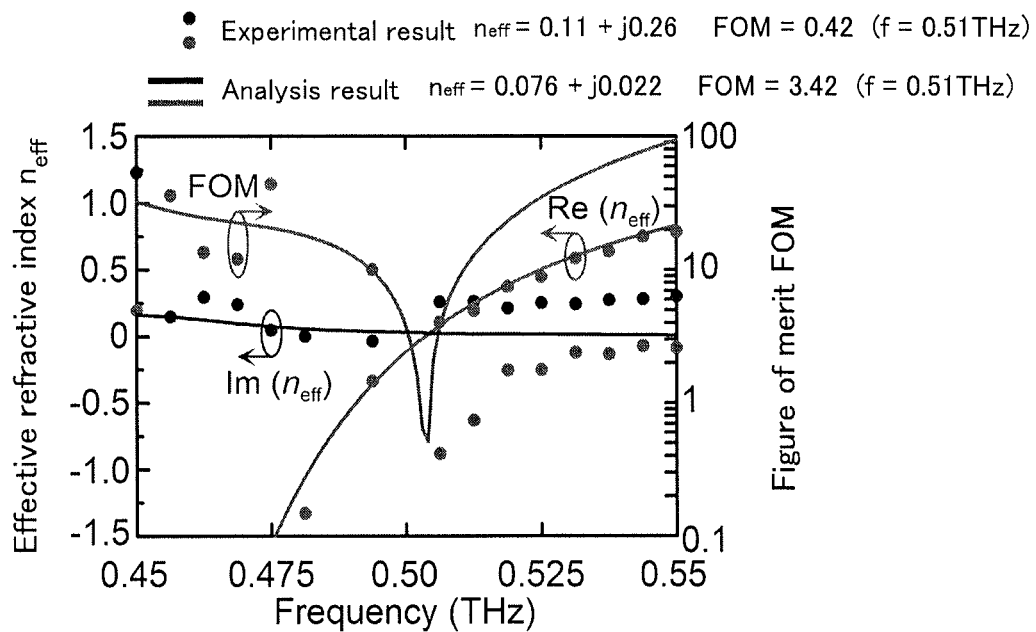
FIG. 4 is a graph showing the frequency characteristic of an FOM and that of a refractive index in the sheet-type metamaterial according to the embodiment of the present invention.

FIG. 4 shows analysis results and experimental results about a performance index FOM (figure of merit) and the frequency characteristic of a complex refractive index in a frequency band from 0.45 to 0.55 THz. By referring to FIG. 4, analysis results about a real part Re ($n_{eff}$) of the complex refractive index show that the real part Re ($n_{eff}$) is about −1.5 at 0.475 Thz, increases with frequency increase, and becomes nearly zero at about 0.504 THz. The real part Re ($n_{eff}$) increases further with frequency increase to about 0.75 at 0.55 THz. Experimental results about the real part Re ($n_{eff}$) of the complex refractive substantially agree with the analysis results. Analysis results about an imaginary part Im ($n_{eff}$) of the complex refractive index show that the imaginary part Im ($n_{eff}$) is about 0.18 at 0.45 Thz, decreases gently with frequency increase, and becomes nearly zero at about 0.55 THz. Experimental results about the imaginary part Im ($n_{eff}$) show that the imaginary part Im ($n_{eff}$) is about 1.25 at 0.45 THz, decreases to about 0.17 at about 0.457 THz, increases to about 0.26 with frequency increase, and substantially agrees with values given in the analysis results in a range from about 0.475 to about 0.49 THz. In a range exceeding 0.5 THz, the experimental results exhibit substantially constant values from about 0.21 to about 0.25.

Analysis results about the performance index FOM in FIG. 4 show that FOM is about 32 at 0.45 THz, decreases with frequency increase, and decreases to a minimum of about 0.5 at about 0.504 THz. Then, FOM increases with frequency increase, and becomes about 90 at 0.55 THz. Experimental results about FOM show that FOM takes values above or below the values in the analysis results in a range up to about 0.49 THz, and that in a range exceeding 0.5 THz, FOM takes smaller values than the values in the analysis results increasing from about 0.3 to about 2.5.

At the design frequency of 0.51 THz, the analysis results show that the resultant effective refractive index $n_{eff}$ is about 0.076+j0.022 and the resultant FOM is about 3.42, whereas the experimental results show that the resultant effective refractive index $n_{eff}$ is about 0.11+j0.26 and the resultant FOM is about 0.42. As understood from the foregoing, employing the dimensions shown in FIG. 3 makes it possible to obtain the sheet-type metamaterial 1 having a nearly zero refractive index at the design frequency of 0.51 THz.

Figure 5:
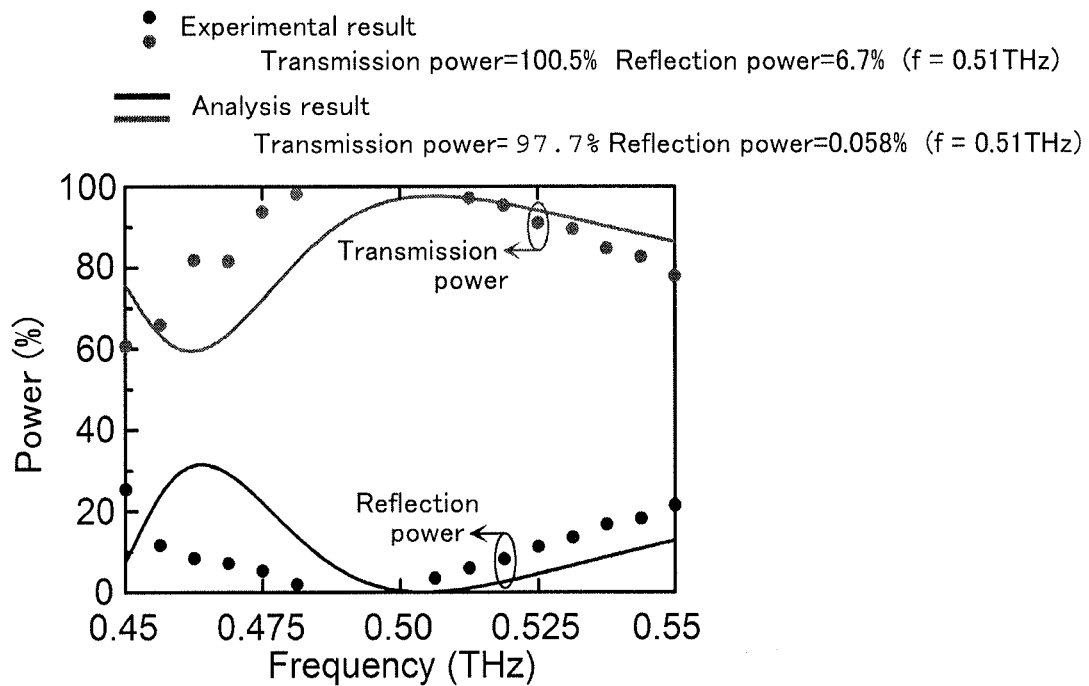
FIG. 5 is a graph showing the frequency characteristic of transmission power and that of reflection power in the sheet-type metamaterial according to the present invention.

FIG. 5 shows analysis results and experimental results about the frequency characteristic of transmission power Tr and that of reflection power Re in a frequency band from 0.45 to 0.55 THz. By referring to FIG. 5, analysis results about transmission power show that the transmission power is about 75% at 0.45 THz, and decreases with frequency increase to about 60% at about 0.46 THz. Then, the transmission power increases to a maximum of about 97.7% at about 0.506 THz. The transmission power thereafter decreases gently with frequency increase to about 88% at 0.55 THz. Experimental results about the transmission power show that the transmission power exceeds values in the analysis results in a range up to about 0.49 THz and maximum transmission power of about 99% is obtained at about 0.506 THz. The experimental results substantially agree with the analysis results at frequencies exceeding 0.5 THz. Meanwhile, the transmission power in the experimental results decreases in a high-frequency range to about 78% at 0.55 THz.

By referring to FIG. 5, analysis results about reflection power show that the reflection power is about 8% at 0.45 THz, and increases with frequency increase to about 31% at about 0.46 THz. Then, the reflection power decreases to a minimum of about 0% at about 0.506 THz. The reflection power thereafter increases gently with frequency increase to about 13% at 0.55 THz. Experimental results about the reflection power show that the reflection power is about 25% at 0.45 THz, and decreases with frequency increase to about 0% at about 0.48 THz. In a range exceeding 0.5 THz, the reflection power increases gently to about 22% at 0.55 THz.

At the design frequency of 0.51 THz, the analysis results show that the resultant transmission power is about 97.7% and the resultant reflection power is about 6.7%, whereas the experimental results show that the resultant transmission power is about 100.5% and the resultant reflection power is about 0.058%. As understood from the foregoing, employing the dimensions shown in FIG. 3 makes it possible to obtain the sheet-type metamaterial 1 having a nearly zero refractive index at the design frequency of 0.51 THz and having favorable transmission power characteristics.

Figure 6:
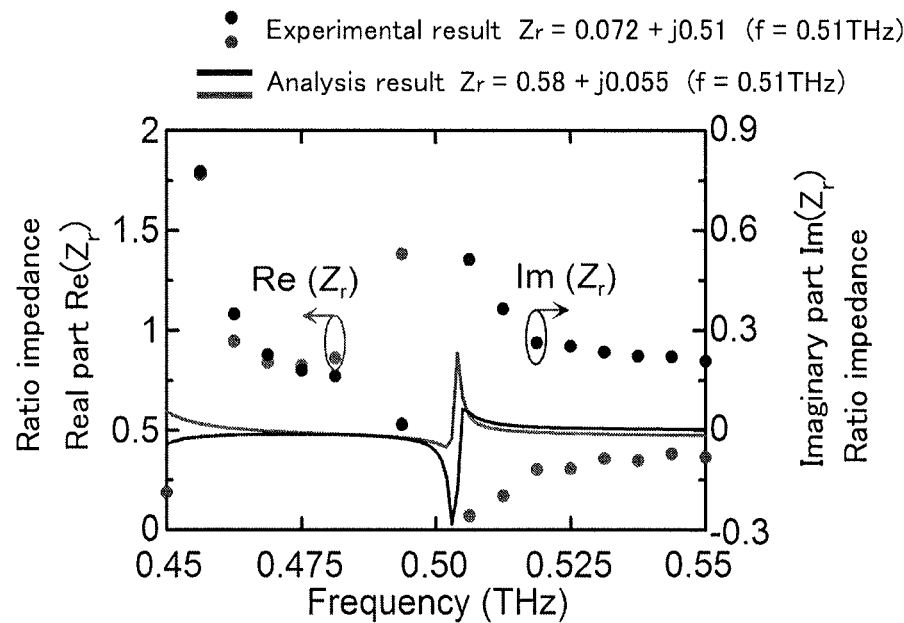
FIG. 6 is a graph showing the frequency characteristic of a relative impedance in the sheet-type metamaterial according to the present invention.

FIG. 6 shows analysis results and experimental results about the frequency characteristic of a relative complex impedance Zr in a frequency band from 0.45 to 0.55 THz in the unit cell 13. By referring to FIG. 6, analysis results about a real part Re (Zr) of the relative complex impedance Zr show that the real part Re (Zr) is about 0.51 at about 0.45 THz, decreases slightly with frequency increase to about 0.5 at about 0.475 THz, and is maintained at this value in a range up to about 0.49 THz. In a range exceeding 0.5 THz, the real part Re (Zr) increases steeply to a maximum of about 0.9 at about 0.505 THz. Then, the real part Re (Zr) decreases steeply to about 0.5 at 0.513 THz and is maintained at about 0.5 in a range up to 0.55 THz. Experimental results about the real part Re (Zr) show that the real part Re (Zr) is about 0.95 at about 0.46 THz, and decreases slightly with frequency increase to about 0.61 at about 0.48 THz. In a range exceeding 0.5 THz, the real part Re (Zr) increases from about 0.07 to about 0.39 at about 0.531 THz and is maintained at this value in a range up to 0.55 THz.

By referring to FIG. 6, analysis results about an imaginary part Im (Zr) of the relative complex impedance Zr show that the imaginary part Im (Zr) is about −0.04 at about 0.45 THz, increases slightly with frequency increase to become nearly zero at about 0.475 THz, and is maintained at this value in a range up to about 0.49 THz. In a range exceeding 0.5 THz, the imaginary part Im (Zr) decreases steeply to about −0.28 at about 0.504 THz. Then, the imaginary part Im (Zr) increases steeply to about 0.04 at 0.503 THz, decreases slightly with frequency increase to become nearly zero at 0.513 THz, and is maintained at this value in a range up to about 0.55 THz. Experimental results about the imaginary part Im (Zr) show that the imaginary part Im (Zr) is about 0.36 at about 0.46 THz, and decreases gently with frequency increase to about 0.17 at about 0.48 THz. In a range exceeding 0.5 THz, the imaginary part Im (Zr) decreases from about 0.52 to about 0.24 at about 0.525 THz, and to about 0.21 at 0.55 THz.

At the design frequency of 0.51 THz, the analysis results show that the resultant relative impedance Zr is 0.58+j0.055, whereas the experimental results show that the resultant relative impedance Zr is 0.72+j0.51.

Figure 7:
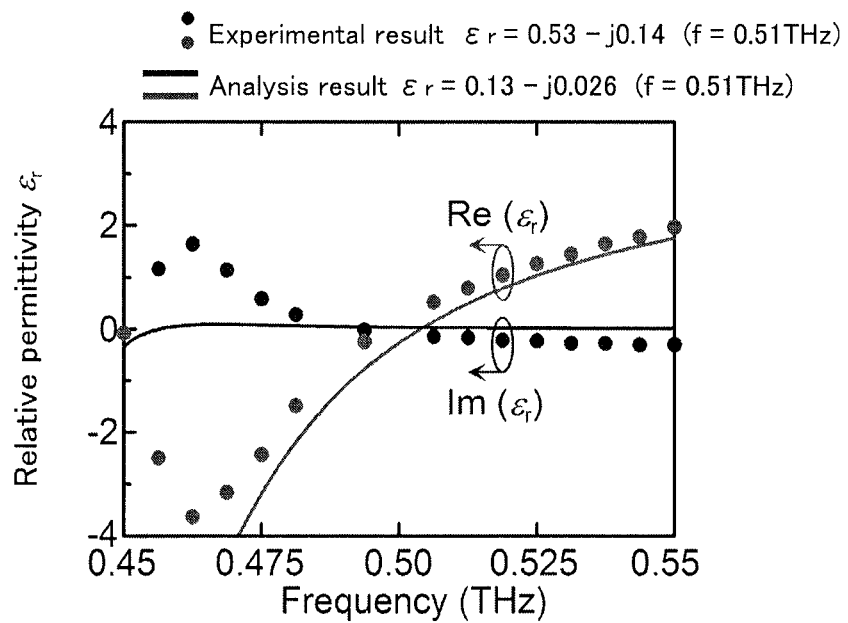
FIG. 7 is a graph showing the frequency characteristic of a relative permittivity in the sheet-type metamaterial according to the present invention.

FIG. 7 shows analysis results and experimental results about the frequency characteristic of a relative permittivity εr in a frequency band from 0.45 to 0.55 THz in the unit cell. By referring to FIG. 7, analysis results about a real part Re (εr) of the relative permittivity εr show that the real part Re (εr) is about −4 at about 0.47 THz, and increases with frequency increase to about −1.34 at about 0.49 THz. The real part Re (εr) continues increasing in a range exceeding 0.5 THz to become nearly zero at about 0.506 THz and about 1.46 at 0.55 THz. Experimental results about the real part Re (εr) show that the real part Re (εr) is about −3.6 at about 0.46 THz, and increases with frequency increase to about −1.47 at 0.48 THz. In a range exceeding 0.5 THz, the real part Re (εr) increases from about 0.4 to about 1.7 at 0.55 THz. These experimental results substantially agree with the analysis results.

By referring to FIG. 7, analysis results about an imaginary part Im (εr) of the relative permittivity εr show that the imaginary part Im (εr) is about −0.3 at about 0.45 THz, increases slightly with frequency increase to become nearly zero at about 0.46 THz, and is maintained at a value nearly zero in a range up to about 0.55 THz. Experimental results about the imaginary part Im (εr) show that the imaginary part Im (εr) is about 1.6 at 0.46 THz, and decreases with frequency increase to about 0.1 at 0.48 THz. In a range exceeding 0.5 THz, the imaginary part Im (εr) decreases slightly from about −0.15 to about −0.25 at about 0.55 THz.

At the design frequency of 0.51 THz, the analysis results show that the resultant relative permittivity εr is 0.13-j0.026, whereas the experimental results show that the resultant relative permittivity εr is 0.53-j0.141.

Figure 8:
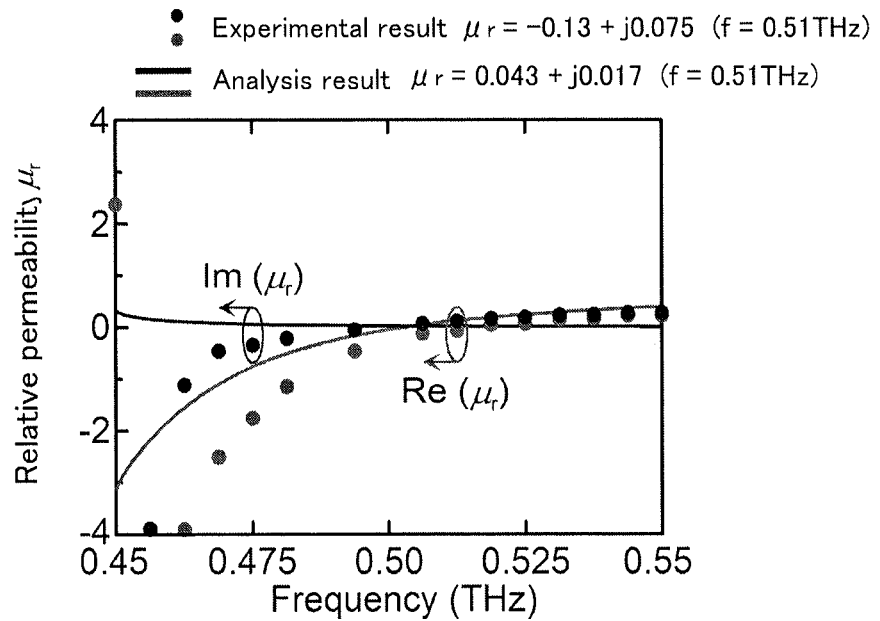
FIG. 8 is a graph showing the frequency characteristic of a relative permeability in the sheet-type metamaterial according to the present invention.

FIG. 8 shows analysis results and experimental results about the frequency characteristic of a relative permeability μr in a frequency band from 0.45 to 0.55 THz in the unit cell 13. By referring to FIG. 8, analysis results about a real part Re (μr) of the relative permeability μr show that the real part Re (μr) is about −3 at 0.45 THz, and increases with frequency increase to become nearly zero at about 0.5 THz. The real part Re (μr) increases slightly in a range exceeding 0.5 THz and to about 0.34 at 0.55 THz. Experimental results about the real part Re (μr) show that the real part Re (μr) is about −4 at about 0.46 THz, and increases with frequency increase to become nearly zero at about 0.5 THz. In a range exceeding 0.5 THz, the real part Re (μr) increases slightly to about 0.27 at 0.55 THz.

By referring to FIG. 8, analysis results about an imaginary part Im (μr) of the relative permeability μr show that the imaginary part Im (μr) is about 0.27 at about 0.45 THz, decreases slightly with frequency increase to become nearly zero at about 0.49 THz, and is maintained at a value nearly zero in a range up to about 0.55 THz. Experimental results about the imaginary part Im (μr) show that the imaginary part Im (μr) is about −4 at 0.456 THz, and increases with frequency increase to about −0.1 at 0.48 THz. In a range exceeding 0.5 THz, the imaginary part Im (μr) increases slightly from about 0.1 to about 0.27 at about 0.55 THz.

At the design frequency of 0.51 THz, the analysis results show that the resultant relative permeability μr is 0.043+j0.017, whereas the experimental results show that the resultant relative permeability μr is −0.13+j0.075.

A refractive index n is expressed as $\sqrt{\varepsilon r \cdot \mu r}$, and the relative permittivity εr and the relative permeability μr in the unit cell 13 take small values expressed as decimal fractions. This shows that the sheet-type metamaterial 1 has a refractive index of nearly zero at the design frequency of 0.51 THz.

FIGS. 9 to 12 show analysis results about the electrical characteristics of the unit cell 13 having the dimensions shown in FIG. 3 in the sheet-type metamaterial 1 according to the present invention. The analysis was conducted using a high-frequency three-dimensional electromagnetic field simulator HFSS. The analysis was conducted on condition that the first cut wire 10a and the second cut wire 11a are made of perfect conductors.

Figure 9:
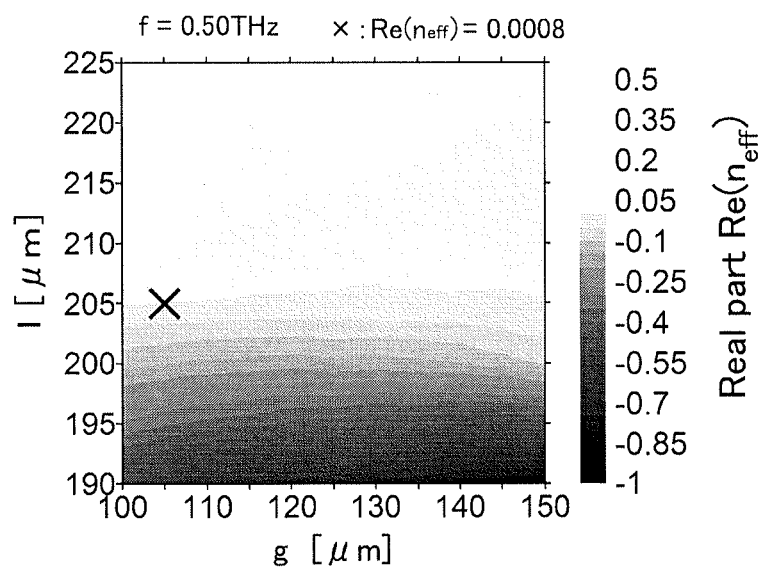
FIG. 9 is a contour chart of a real part of a refractive index at 0.5 THz with parameters including a gap g and a length l about the unit cell in the sheet-type metamaterial according to the present invention.

FIG. 9 is a contour chart of the real part Re ($n_{eff}$) of the effective refractive index $n_{eff}$ at a frequency of 0.50 THz with the gap g between the first cut wires 10a and between the second cut wires 11a in the y-axis direction set in a range from 100 to 150 μm, and the length l of the first cut wire 10a and the second cut wire 11a in a range from 190 to 225 μm in the unit cell 13 having the dimensions shown in FIG. 3. By referring to FIG. 9, the refractive index tends to increase from −1 to 0.5 with increase in the length l from 190 to about 225 μm. With the length l set at about 205 μm and the gap g at about 105 μm, the real part Re ($n_{eff}$) of the effective refractive index $n_{eff}$ is an extremely low refractive index of about 0.0008, which can be considered to be nearly zero.

Figure 10:
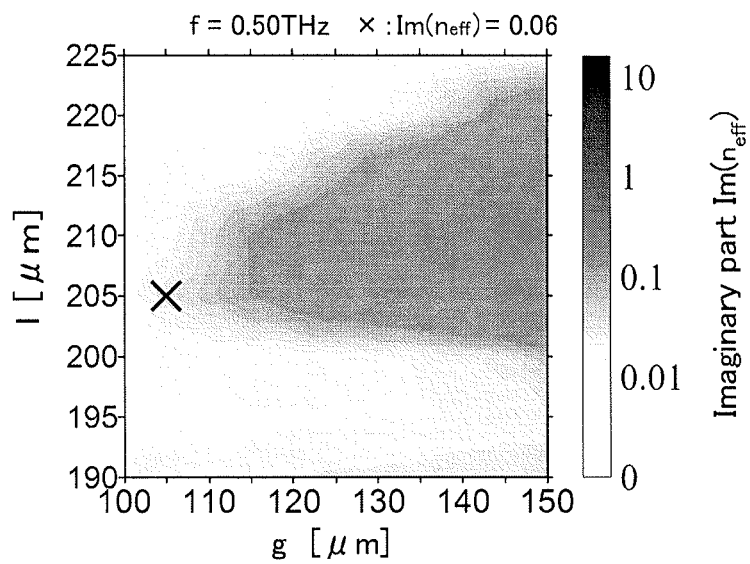
FIG. 10 is a contour chart of an imaginary part of the refractive index at 0.5 THz with parameters including the gap g and the length l about the unit cell in the sheet-type metamaterial according to the present invention.

FIG. 10 is a contour chart of the imaginary part Im ($n_{eff}$) of the effective refractive index $n_{eff}$ at a frequency of 0.50

THz with the gap g between the first cut wires 10*a* and between the second cut wires 11*a* in the y-axis direction set in a range from 100 to 150 µm, and the length l of the first cut wire 10*a* and the second cut wire 11*a* in a range from 190 to 225 µm in the unit cell 13 having the dimensions shown in FIG. 3. By referring to FIG. 10, the imaginary part Im ($n_{eff}$) of the effective refractive index $n_{eff}$ tends to increase from about 0.1 to about one with increase in the gap g from 100 to 150 µm while the length l is in a range from 200 to about 225 µm. With the length l set at about 205 µm and the gap g at about 105 µm, the imaginary part Im ($n_{eff}$) of the effective refractive index $n_{eff}$ is an extremely low refractive index of about 0.06, which is nearly zero.

Figure 11:
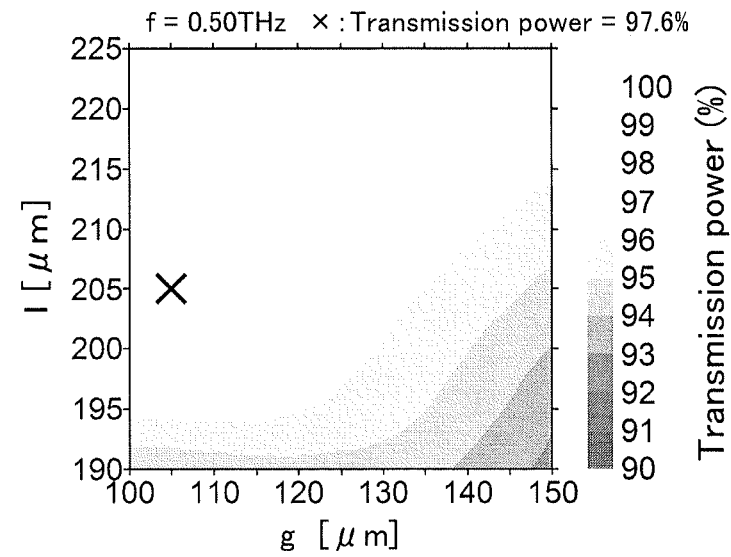
FIG. 11 is a contour chart of transmission power at 0.5 THz with parameters including the gap g and the length l about the unit cell in the sheet-type metamaterial according to the present invention.

FIG. 11 is a contour chart of transmission power at a frequency of 0.50 THz with the gap g between the first cut wires 10*a* and between the second cut wires 11*a* in the y-axis direction set in a range from 100 to 150 µm, and the length l of the first cut wire 10*a* and the second cut wire 11*a* in a range from 190 to 225 µm in the unit cell 13 having the dimensions shown in FIG. 3. By referring to FIG. 11, reducing the gap g from 150 to 100 µm with the length l set in a range from 195 to about 225 µm is found to achieve transmission power of about 93% or more. Favorable transmission power of about 97.6% can be achieved with the length l and the gap g set at about 205 µm and about 105 µm respectively.

Figure 12:
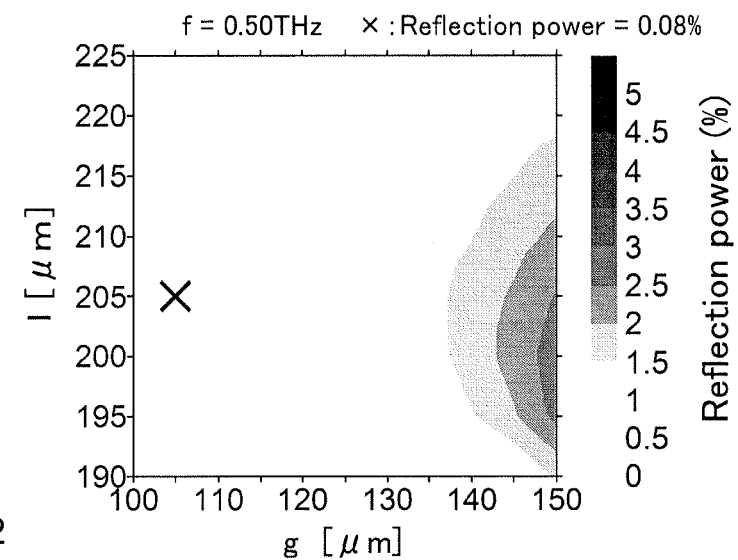
FIG. 12 is a contour chart of reflection power at 0.5 THz with parameters including the gap g and the length l about the unit cell in the sheet-type metamaterial according to the present invention.

FIG. 12 is a contour chart of reflection power at a frequency of 0.50 THz with the gap g between the first cut wires 10*a* and between the second cut wires 11*a* in the y-axis direction set in a range from 100 to 150 µm, and the length l of the first cut wire 10*a* and the second cut wire 11*a* in a range from 190 to 225 µm in the unit cell 13 having the dimensions shown in FIG. 3. Referring to FIG. 12, favorable reflection power of about 1% or less is found to be achieved throughout the range of the length l except a range for the gap g from about 137 to about 150 µm. Favorable reflection power of about 0.08% is achieved with the length l and the gap g set at about 205 µm and about 105 µm respectively.

As shown in FIGS. 9 to 12, employing the dimensions shown in FIG. 3 makes it possible to obtain the sheet-type metamaterial 1 having a nearly zero refractive index and favorable transmission power characteristics at a frequency of 0.50 THz.

Figures 13, 14:
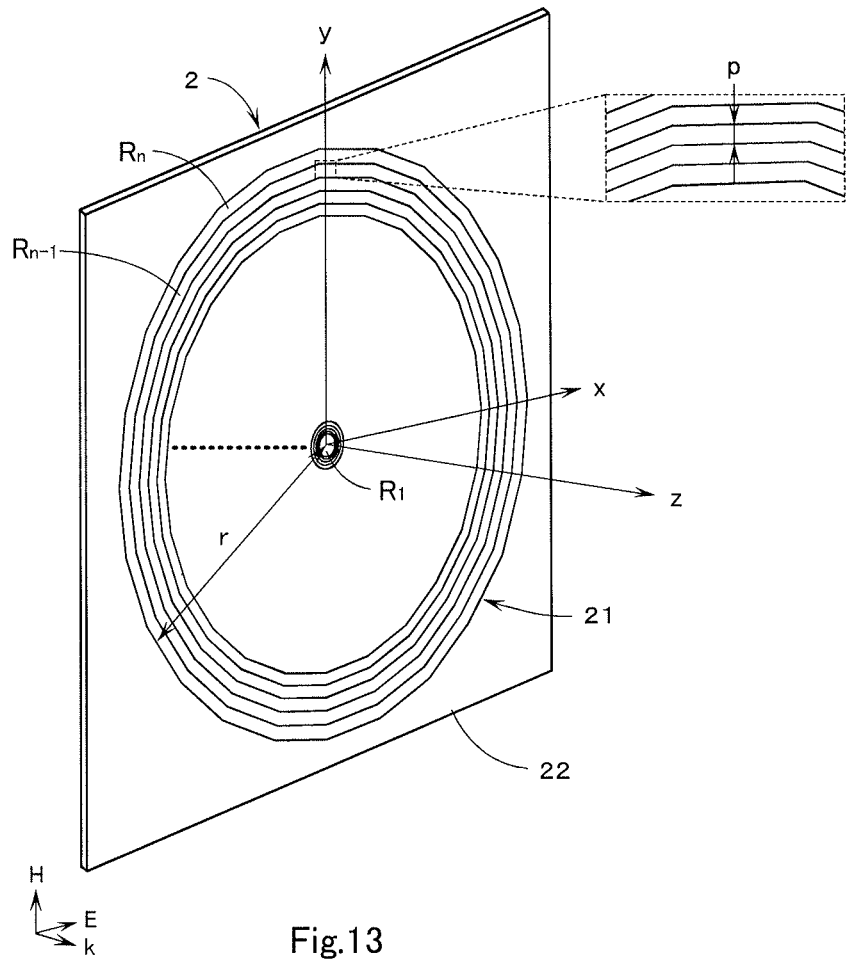
FIG. 13 is a perspective view and a partially enlarged view showing the configuration of a sheet-type lens according to an embodiment of the present invention.
FIG. 14 is a table showing exemplary dimensions of the sheet-type lens according to the embodiment of the present invention.

FIG. 13 is a perspective view showing the configuration of a sheet-type lens 2 according to an embodiment of the present invention applying the sheet-type metamaterial according to the present invention. FIG. 14 is a table showing exemplary dimensions of the sheet-type lens 2 of the present invention.

The sheet-type lens 2 of the present invention shown in FIG. 13 is configured by forming a sheet-type metamaterial 21 having a polygonal shape approximate to a circle (hereinafter called substantially circular) of a radius r on a rectangular dielectric substrate 22 made of a flexible film placed in the x-y plane. In the sheet-type metamaterial 21, the substantially circular shape is divided into multiple concentric n regions including a substantially circular region R1 at a central part, and multiple substantially circular ring-like regions R2 to Rn surrounding the region R1. As shown in the partially enlarged view, these regions are arranged with a pitch p (the height of a region in a radial direction). The highest positive refractive index is set at the region R1 at the center. The regions R1 to Rn have respective refractive indexes set to be lower gradually with an increasing distance from the center toward an outer region. An intermediate k-th region Rk (1<k<n) has a refractive index set at zero. Regions outside the k-th region Rk from R(k+1) to Rn have negative refractive indexes set to be lower gradually from the region R(k+1) toward the region Rn. As understood from the foregoing, the sheet-type lens 2 according to the present invention is a sheet-type lens 2 having distributed refractive indexes.

FIG. 14 shows exemplary dimensions of the sheet-type lens 2 having distributed refractive indexes according to the present invention and exemplary refractive indexes in the sheet-type lens 2 with a design frequency set at 1 THz and a focal length at 5.0 mm. Referring to FIG. 14, the radius r of the sheet-type lens 2 is set at about 2.41 mm, the pitch p between all the regions R1 to Rn at about 20 µm, and the number of regions at 121. The region R1 at the center has a refractive index n1 set at about 5.00, an 81$^{st}$ region R81 has a refractive index n81 set at nearly zero, and an outermost region R121 has a refractive index n121 set at about −5.92. In this case, the number of regions is 121. However, the sheet-type lens 2 according to the present invention is not limited to this number of regions.

The region R1 is substantially circular, and the regions R2 to Rn have substantially circular ring-like shapes. A large number of unit cells are formed in each of the regions R1 to Rn and are aligned in the circumferential direction and the radial direction of a region where the unit cells exist. A unit cell has a set refractive index required for a region where the unit cell exists. In this case, unit cells are formed to be aligned at predetermined intervals and parallel to each other in the tangential direction and the radial direction of a region where the unit cells exist. The configuration of a unit cell formed in a region differs between the regions R1 to Rk where a refractive index is positive or zero, and the regions R(k+1) to Rn where a refractive index is negative. The unit cell formed in the regions R1 to Rk where a refractive index is positive or zero has the configuration of the unit cell 13 shown in FIG. 2. The unit cell formed in the regions R(k+1) to Rn where a refractive index is negative has the configuration of a unit cell 33 shown in FIGS. 15 and 16A.

In the unit cells 13 formed in the regions R1 to Rk, a refractive index of five or more can be achieved with a working frequency set in a range from 0.3 to 0.5 THz, the width w of the first cut wire 10*a* and the second cut wire 11*a* in a range from about 46 to about 50 µm, the space s in a range from about 160 to about 162 µm, the thickness d at about 50 µm, and the length l at a length approximate to a value to generate resonance at the working frequency. In this case, a refractive index of eight or more can be achieved by setting the thickness d of the dielectric substrate 22 at about 23 µm while maintaining the other dimensions. Additionally, a higher refractive index can be achieved by reducing the thickness d. Further, a refractive index of three or more can be achieved with a working frequency set in a range from 0.6 to 0.9 THz, the width w of the first cut wire 10*a* and the second cut wire 11*a* at about 46 µm, the space s at about 162 µm, the thickness d at about 50 µm, and the length l at a length approximate to a value to generate resonance at the working frequency. In this case, a refractive index of about six or more can be achieved by setting the thickness d at about 23 µm while maintaining the other dimensions. Additionally, a higher refractive index can be achieved by reducing the thickness d.

In the unit cells 13 formed in the regions R1 to Rk, a refractive index of nearly zero can be achieved with the length l of the first cut wire 10*a* and the second cut wire 11*a* set at about 205±10 µm, the width w at about 120 µm, the gap g in a range from 100 to 150 µm, and the space s at about 360 µm.

As understood from the foregoing, a refractive index required for each of the regions R1 to Rk, for example, a refractive index in a range from zero to 5.00, is achieved by adjusting dimensions of the unit cells 13 formed in these regions including the length l and the width w of the first cut wire 10a and the second cut wire 11a and dimensions including the gap g and the space s in response to a design frequency and the intended refractive index.

The configuration of the unit cell 33 shown in FIGS. 15 and 16A corresponds to the configuration of unit cells formed in the regions R(k+1) to Rn having refractive indexes set at negative values.

The unit cell 33 shown in these drawings includes the dielectric substrate 22 placed in the x-y plane. The dielectric substrate 22 has a front surface on which an elongated rectangular first cut wire 31 is formed to extend in the y direction, and a back surface on which an elongated rectangular second cut wire 32 is formed to overlap the first cut wire 31 in the y-axis direction while being shifted from the first cut wire 31 by about a half to be asymmetric with the first cut wire 31. In this case, both the first cut wires 31 and the second cut wires 32 are arranged in the y-axis direction (long-axis direction) with the gap g therebetween, and are arranged to be parallel to each other in the x-axis direction (short-axis direction) with the space s therebetween. By doing so, while a large number of the unit cells 33 are aligned to be parallel to each other in the circumferential direction and the radial direction of the regions R(k+1) to Rn, the gap g is defined in the long-axis direction between the first cut wires 31 and the space s is defined in the short-axis direction between the first cut wires 31. For example, the dielectric substrate 22 is made of a cycloolefin polymer film having a relative permittivity of about 2.34 and low-loss characteristics expressed by tan δ of about 0.0016. The dielectric substrate 22 may be a different low-loss dielectric film. The first cut wire 31 and the second cut wire 32 are each formed, for example, by etching a metallic film formed on the dielectric substrate 22 to a thickness t, or by printing with metallic ink.

The unit cell 33 is arranged in the x-y plane and surrounded by a periodic boundary wall 35, as shown in FIG. 15. An incident wave In in a terahertz wave band polarized in the y direction enters through the periodic boundary wall 35. The incident wave In has an electric field component E acting in the y direction, and a magnetic field component H acting in the x direction. The incident wave In travels in a direction k corresponding to the z direction. Then, flux linkage is generated to cause a flow of a current in an opposite direction between the first cut wire 31 and the second cut wire 32 on the dielectric substrate 22 to make the first cut wire 31 and the second cut wire 32 function as a magnetic particle. In particular, at a resonant frequency determined based on the length l of the first cut wire 31 and the second cut wire 32 or a frequency higher than the resonant frequency, a frequency band where an equivalent permeability takes a negative value is generated. Further, polarization is generated on the first cut wire 31 and the second cut wire 32 by the application of the electric field E acting in the y direction to make the first cut wire 31 and the second cut wire 32 further function as a dielectric particle. In particular, at a resonant frequency determined based on the length l of the first cut wire 31 and the second cut wire 32 or a frequency higher than the resonant frequency, a frequency band where an equivalent permittivity takes a negative value is generated. In this case, in the unit cell 33 shown in FIG. 15, the first cut wire 31 and the second cut wire 32 are shifted by about a half of the length l to reduce an overlap therebetween, thereby increasing a resonant frequency indicating magnetic properties. Further, capacitance increase occurs not only between the first cut wire 31 and the second cut wire 32 arranged one above the other but also between the first cut wire 31 and the second cut wire 31 facing each other via the dielectric substrate 22, thereby reducing a resonant frequency indicating dielectric properties. In this way, the resonant frequency indicating magnetic properties becomes higher than the resonant frequency indicating dielectric properties to generate resonance of magnetic properties in a band where a permittivity takes a negative value. Thus, a frequency range in a predetermined region where both a permittivity and a permeability take negative values can be achieved in the unit cell 33, and a negative refractive index can be achieved in this frequency range. A metallic material such as gold, silver, copper, or aluminum can be used for forming the first cut wire 31 and the second cut wires 32.

In the unit cells 33 formed in the regions R(k+1) to Rn, a negative refractive index can be achieved in a range from about 0.3 to about 0.9 THz with the thickness d of the dielectric substrate 22 set at about 50 μm, the space s at about 178 μm, the gap g in a range from about 10 to about 100 μm, the length l of the first cut wire 31 and the second cut wire 32 in a range from about 90 to about 360 μm, and the width w at about 32 μm.

As understood from the foregoing, a refractive index required for each of the regions R(k+1) to Rn, for example, a refractive index in a range from zero to −5.92, can be achieved by adjusting dimensions of the unit cells 33 formed in these regions including the length l and the width w of the first cut wire 31 and the second cut wire 32 and dimensions including the gap g and the space s in response to a design frequency and the intended refractive index. In the unit cell 13, a negative refractive index in a range from about zero to about 0.6 is achieved with the length l of the first cut wire 10a and the second cut wire 11a set in a range from about 195 to about 205 μm and the gap g in a range from about 100 to about 120 μm. Thus, the unit cell 13 may be used in regions of a predetermined number from the region R(k+1).

Figure 17A:
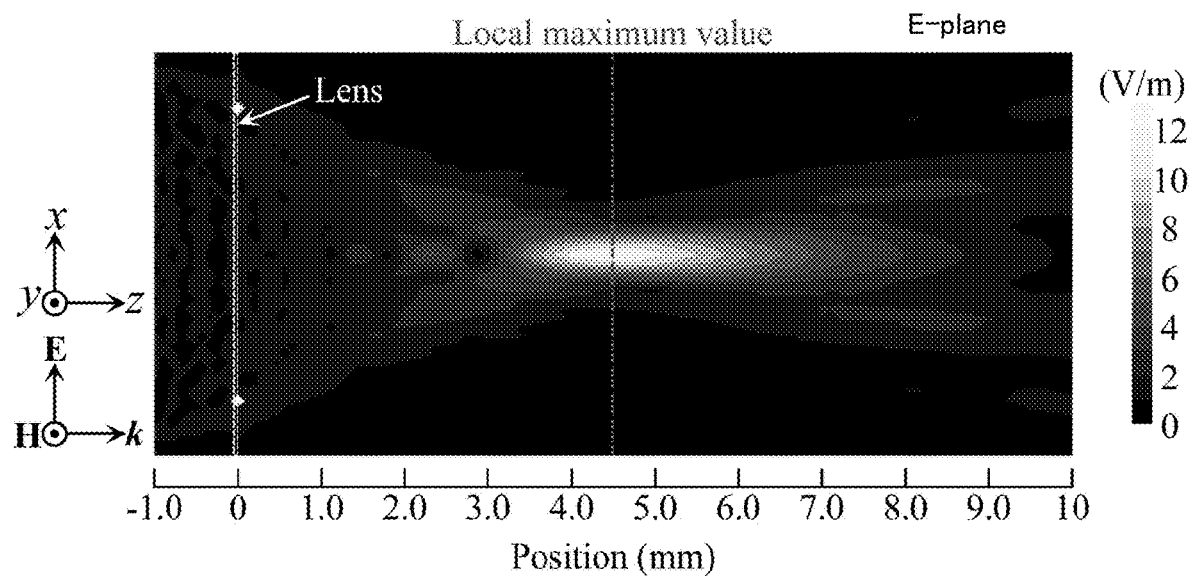
FIG. 17A shows a distribution of the magnitude of electric field in an E-plane and FIG. 17B shows a corresponding distribution in an H-plane of the sheet-type lens according to the embodiment of the present invention.
Figure 17B:
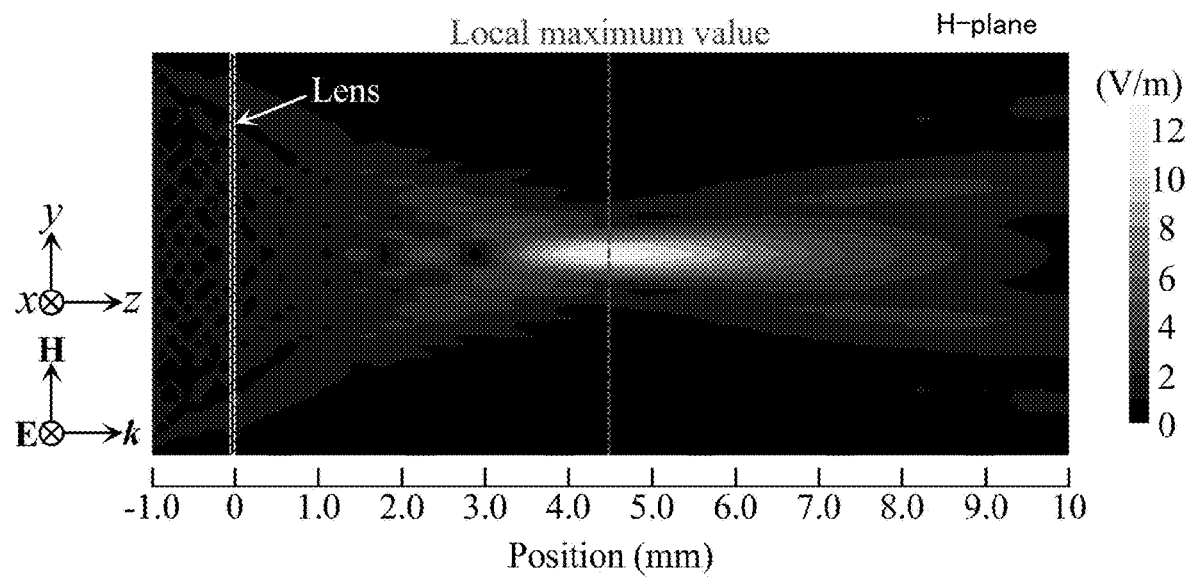

FIGS. 17A and 17B show a distribution of the magnitude of the electric field in an E-plane (E-plane) and a corresponding distribution in an H-plane (H-plane) respectively responsive to incidence of a terahertz wave at a frequency of 1 THz on the sheet-type lens 2 according to the present invention obtained by employing the dimensions, the number of regions, and the refractive indexes shown in FIG. 14.

By referring to the distribution of the magnitude of the electric field in the E-plane (E-plane) shown in FIG. 17A, a horizontal axis shows a position (Position) on an optical axis (z axis) from the sheet-type lens 2 (lens). A position in the E-plane separated by a distance of about 4.54 mm from the sheet-type lens 2 is found to be a position where the magnitude of the electric field is at a maximum. By referring to the distribution of the magnitude of the electric field in the H-plane (H-plane) shown in FIG. 17B, a horizontal axis shows a position (Position) on the optical axis from the sheet-type lens 2 (lens). A position in the H-plane separated by a distance of about 4.54 mm from the sheet-type lens 2 is found to be a position where the magnitude of the electric field is at a maximum.

Figure 18:
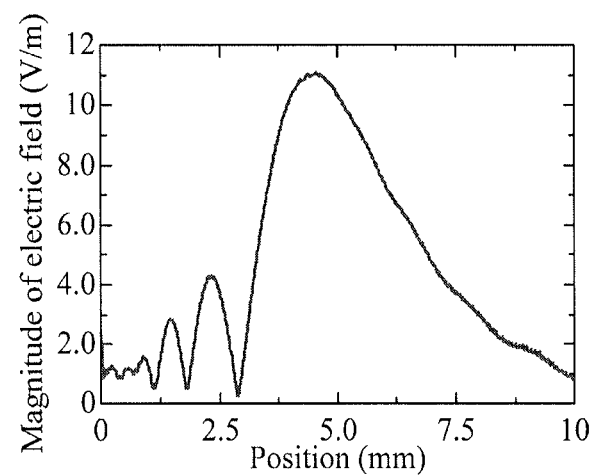
FIG. 18 shows the magnitude of electric field on an optical axis of the sheet-type lens according to the embodiment of the present invention.

FIG. 18 shows the magnitude of the electric field on the optical axis (z-axis) of the sheet-type lens 2 of the present invention responsive to incidence of a terahertz wave at a frequency of 1 THz on the sheet-type lens 2 of the present invention obtained by employing the dimensions, the number of regions, and the refractive indexes shown in FIG. 14.

By referring to FIG. 18, a horizontal axis shows a distance on the optical axis (z-axis) from the sheet-type lens 2 (lens), and a vertical axis shows the magnitude of electric field. If a distance from the sheet-type lens 2 exceeds about 2.6 mm, the magnitude of the electric field increases steeply to a maximum (about 11 [V/m]) at a position of about 4.5 mm. If a distance exceeds about 4.5 mm, the magnitude of the electric field is found to decrease in response to the distance. The magnitude of the electric field is about 0.9 [V/m] at a position where a distance is 10 mm.

Figure 19:
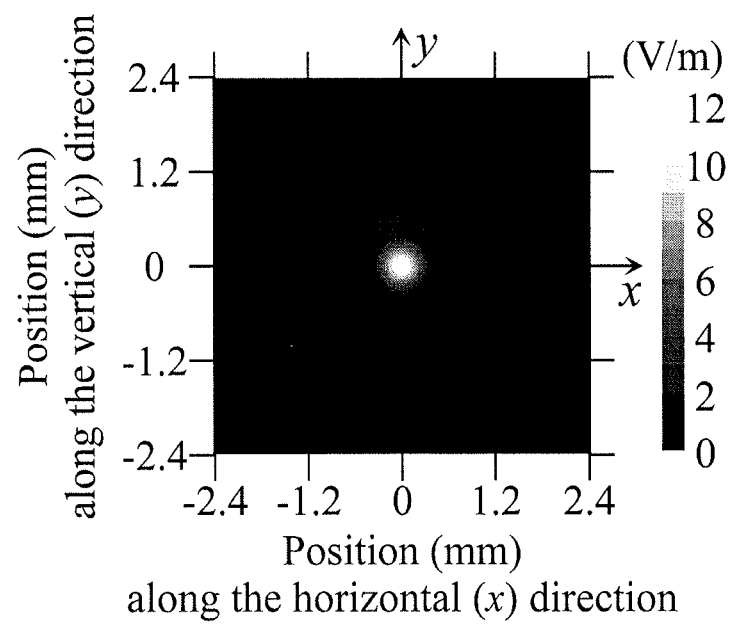
FIG. 19 shows a distribution of the magnitude of electric field in a plane perpendicular to the optical axis of the sheet-type lens according to the embodiment of the present invention.
Figure 20:
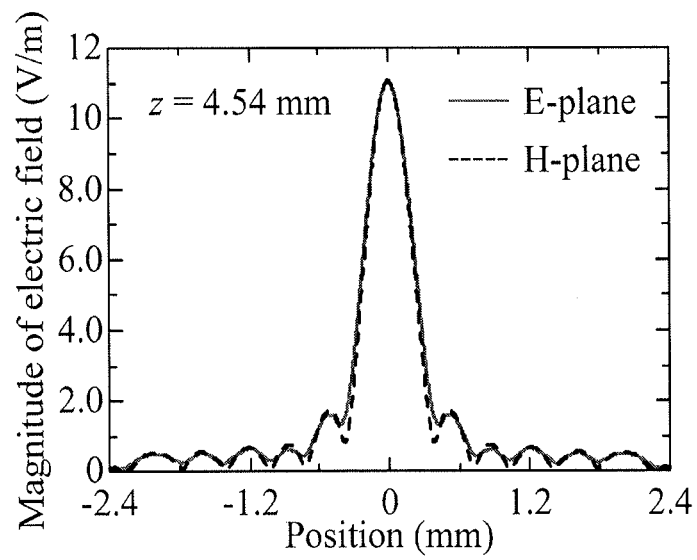
FIG. 20 shows the magnitude of electric field in the plane perpendicular to the optical axis of the sheet-type lens according to the embodiment of the present invention relative to a distance at the plane perpendicular to the optical axis.
Figure 21:
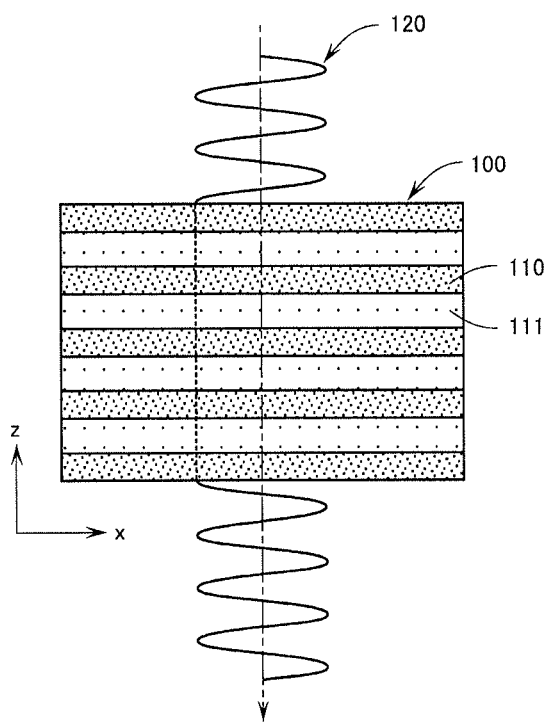
FIG. 21 is a conceptual view showing a conventional metamaterial achieving a zero refractive index.

FIG. 19 shows a distribution of the magnitude of the electric field in a plane centered on the optical axis (z axis) of the sheet-type lens 2 of the present invention responsive to incidence of a terahertz wave at a frequency of 1 THz on the sheet-type lens 2 of the present invention obtained by employing the dimensions, the number of regions, and the refractive indexes shown in FIG. 14. FIG. 20 shows the magnitude of the electric field in the plane centered on the optical axis of the sheet-type lens 2 of the present invention relative to a distance from the center responsive to incidence of the terahertz wave at a frequency of 1 THz on the sheet-type lens 2 of the present invention obtained by employing the dimensions, the number of regions, and the refractive indexes shown in FIG. 14.

FIG. 19 shows a distribution of the magnitude of the electric field in the plane centered on the optical axis obtained at a position on the optical axis (z axis) where a distance from the sheet-type lens 2 (lens) is 4.54 mm. By referring to FIG. 19, the magnitude of the electric field is found to be at a maximum at a position of 0 mm on the vertical axis where a vertical position is at the center, and at a position of 0 mm on the horizontal axis where a horizontal position is at the center.

FIG. 20 shows a distribution of the magnitude of the electric field in the E-plane (E-plane) and a corresponding distribution in the H-plane (H-plane), both in the plane centered on the optical axis obtained at a position on the optical axis (z axis) where a distance from the sheet-type lens 2 (lens) is 4.54 mm. By referring to FIG. 20, the magnitude of the electric field in the E-plane (E-plane) indicated by a solid line is at a maximum (about 11 [V/m]) at a position (Position) of 0 mm corresponding to a center position. The magnitude of the electric field is reduced steeply with increase in a distance from the position of 0 mm to about 1.4 [V/m] at positions of about plus and minus 0.6 mm and to about 1 [V/m] or less at positions exceeding about plus and minus 0.8 mm. The magnitude of electric field in the H-plane (H-plane) indicated by a dashed line is at a maximum (about 11 [V/m]) at a position (Position) of 0 mm corresponding to a center position. The magnitude of the electric field is reduced steeply with increase in a distance from the position of 0 mm to about 0.9 [V/m] at positions of about plus and minus 0.6 mm, and then fluctuates repeatedly. At positions exceeding about plus and minus 0.8 mm, the magnitude of the electric field is reduced to 1 [V/m] or less.

In the above-described sheet-type lens 2 of the present invention, a focal point is formed at a position of about 4.54 mm on the optical axis (z axis) from the sheet-type lens 2 (Lens), and the sheet-type lens 2 is found to be a lens functioning favorably in a terahertz wave band.

INDUSTRIAL APPLICABILITY

In the above-described sheet-type metamaterial and sheet-type lens of the present invention, the dielectric substrate is not limited to a cycloolefin polymer film, as long as the dielectric substrate has low-loss characteristics. Changing the relative permittivity of the dielectric substrate changes a wavelength shortening ratio at the dielectric substrate. Thus, the length l of the first cut wire and the second cut wire is determined in response to the wavelength shortening ratio. The dielectric substrate made of a cycloolefin polymer film has a relative permittivity of about 2.34, so that a wavelength shortening ratio at the dielectric substrate becomes about 0.654. Although, a metallic material used for forming the first cut wire and the second cut wire is not limited to gold, silver, copper, or aluminum, a metallic material of low resistance loss is preferred.

The sheet-type metamaterial of the present invention includes: the elongated metallic first cut wires of the predetermined length l aligned on the front surface of the dielectric substrate of the thickness d in the y-axis direction and in the x-axis direction perpendicular to the y axis with the space s therebetween; and the second cut wires having the same shape as the first cut wires and aligned on the back surface of the dielectric substrate so as to overlap the first cut wires and to be symmetric with the first cut wires.

The sheet-type lens of the present invention is configured by forming the sheet-type metamaterial on the single thin dielectric substrate. The sheet-type metamaterial is divided into multiple substantially circular concentric regions including a substantially circular region at a central part, and multiple substantially circular ring-like regions surrounding the region at the central part. The region at the central part has a high positive refractive index. A refractive index is reduced gradually with a decreasing distance toward an outer region. An intermediate region has a refractive index of nearly zero. Regions outside the region having the refractive index of nearly zero have negative refractive index reduced gradually. By doing so, the sheet-type lens having distributed refractive indexes and functioning favorably in a terahertz wave band is realized using the single thin dielectric substrate. In the sheet-type lens of the present invention, the number of regions is 121 and the $81^{st}$ region has a zero refractive index. However, this does not limit the present invention. Any number of regions causing the sheet-type lens of the present invention to function as a lens is applicable. A zero refractive index may be set at any region in a range from the region at the center to the outermost region. Additionally, in the sheet-type lens of the present invention, the dielectric substrate has a rectangular shape and the sheet-type metamaterial formed on the dielectric substrate has a circular shape. Alternatively, the dielectric substrate may have a circular or polygonal shape. Further, the sheet-type metamaterial may have a circular or rectangular shape.

REFERENCE SIGNS LIST

1 Sheet-type metamaterial
2 Sheet-type lens
10 First wire array
10a First cut wire
11 Second wire array
11a Second cut wire
12 Dielectric substrate
13 Unit cell
14 Periodic boundary wall
21 Sheet-type metamaterial
22 Dielectric substrate
31 First cut wire
32 Second cut wire
33 Unit cell
35 Periodic boundary wall 100 Metamaterial
110 Metal
111 Dielectric substance

The invention claimed is:

1. A sheet-type metamaterial comprising:
a film-shaped dielectric substrate;
a first wire array formed on one surface of the dielectric substrate; and
a second wire array formed on an opposite surface of the dielectric substrate, wherein
the first wire array includes elongated metallic first cut wires of a predetermined length l aligned in a direction of a y axis of the dielectric substrate with a gap g therebetween and in an x-axis direction perpendicular to the y axis with space s therebetween,
the second wire array includes metallic second cut wires having the same shape as the first cut wires and aligned so as to overlap the first cut wires and to be symmetric with the first cut wires, and
with a design frequency set at 0.51 THz, a thickness d of the dielectric substrate is set at 50 μm, the space s is set at 360.7 μm, the gap g is set at 105 μm or 106 μm, the width w of the first cut wires and the second cut wires is set at 120.2 μm and the length l of the first cut wires and the second cut wires is set at 202.2 μm or 205 μm.

2. A sheet-type lens comprising a large number of unit cells aligned on a film-shaped dielectric substrate, wherein
the unit cells each include an elongated metallic first cut wire of a predetermined length l formed on one surface of the dielectric substrate, and a metallic second cut wire having the same shape as the first cut wire and formed on an opposite surface of the dielectric substrate,
the first cut wires of the unit cells are aligned on the one surface of the dielectric substrate in a y-axis direction with a gap g therebetween and in an x-axis direction perpendicular to the y-axis direction with space s therebetween,
the second cut wires of the unit cells are aligned on the opposite surface of the dielectric substrate in the y-axis direction with the gap g therebetween and in the x-axis direction perpendicular to the y-axis direction with the space s therebetween,
the first cut wire and the second cut wire each have a long axis extending substantially parallel to the y-axis direction,
the dielectric substrate has a region divided into n regions from a region at a central part to a region at an outer edge of the dielectric substrate,
an innermost first region R1 has a positive refractive index,
an outermost n-th region Rn has a negative refractive index,
a predetermined region Rk between the first region R1 and the n-th region Rn has a zero refractive index, and
a refractive index is reduced gradually with an increasing distance from the first region R1 toward the n-th region Rn,
wherein
in regions between the first region R1 and the region Rk, the first cut wire and the second cut wire are arranged to overlap each other and to be symmetric with each other, and
in regions between a region R(k+1) next to the region Rk and the n-th region Rn, the first cut wire and the second cut wire are arranged to overlap each other and to be asymmetric with each other by being shifted in the y-axis direction.

3. The sheet-type lens according to claim 2, wherein
to obtain a predetermined refractive index, dimensions about the first cut wire and the second cut wire including a width w, the predetermined length l, the space s, and the gap g are adjusted in regions from the first region to the n-th region.

* * * * *